US012179113B2

(12) United States Patent
Salik

(10) Patent No.: US 12,179,113 B2
(45) Date of Patent: Dec. 31, 2024

(54) METHODS AND SYSTEMS FOR DYNAMICALLY SELECTING AND MODIFYING DIGITAL ASSETS WITHIN GAME ELEMENTS OF A MULTIPLAYER VIDEO GAME

(71) Applicant: Activision Publishing, Inc., Santa Monica, CA (US)

(72) Inventor: Omer Salik, Hermosa Beach, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 17/643,443

(22) Filed: Dec. 9, 2021

(65) Prior Publication Data

US 2022/0176251 A1 Jun. 9, 2022

Related U.S. Application Data

(60) Provisional application No. 63/123,356, filed on Dec. 9, 2020.

(51) Int. Cl.
| | | |
|---|---|---|
| *A63F 13/00* | (2014.01) | |
| *A63F 13/61* | (2014.01) | |
| *A63F 13/67* | (2014.01) | |
| *A63F 13/69* | (2014.01) | |

(52) U.S. Cl.
CPC .............. *A63F 13/61* (2014.09); *A63F 13/67* (2014.09); *A63F 13/69* (2014.09); *A63F 2250/22* (2013.01)

(58) Field of Classification Search
CPC .......... A63F 13/52; A63F 13/60; A63F 13/58; A63F 13/79; A63F 13/46; A63F 13/00; A63F 13/69
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Erikson, "Hierarchical Levels of Detail to Accelerate the Rendering of Large Static and Dynamic Polygonal Environments" University of NC Chapel Hill 2000 (Year: 2000).

(Continued)

*Primary Examiner* — David L Lewis
*Assistant Examiner* — Eric M Thomas
(74) *Attorney, Agent, or Firm* — Novel IP

(57) ABSTRACT

The present specification describes computer-implemented methods and systems for selecting and modifying messaging within a virtual gaming environment. Digital assets are selectively placed at various locations within scenes of the virtual gaming environment for improved visibility and impact. The scenes are evaluated and scored based on past, real time and predicted game data, to determine scores. The scores are used to identify values of digital asset placement within those scenes.

28 Claims, 5 Drawing Sheets

(56) References Cited

U.S. PATENT DOCUMENTS

| | | |
|---|---|---|
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,764,232 A | 6/1998 | Oouchi |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,421,051 B1 | 7/2002 | Kato |
| 6,426,750 B1 | 7/2002 | Hoppe |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,574 B2 | 7/2004 | Mao |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |

(56) References Cited

U.S. PATENT DOCUMENTS

| | | |
|---|---|---|
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,243,064 B1 | 8/2012 | Moravanszky |
| 8,245,241 B2 | 8/2012 | Hamilton, II |
| 8,245,283 B2 | 8/2012 | Dawson |
| 8,265,253 B2 | 9/2012 | D Amora |
| 8,281,281 B1 | 10/2012 | Smyrl |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,147,288 B1 | 9/2015 | Johnston |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,384,593 B2 | 7/2016 | Anttila |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,905,036 B2 | 2/2018 | Kim |
| 10,664,942 B2 | 5/2020 | Paltashev |
| 2004/0070595 A1* | 4/2004 | Atlas ............... G06Q 10/10 715/723 |
| 2005/0146524 A1 | 7/2005 | Gueziec |
| 2006/0080072 A1 | 4/2006 | Lachman |
| 2007/0198363 A1* | 8/2007 | Quoc ............... G06F 16/951 705/26.1 |
| 2007/0198364 A1* | 8/2007 | Quoc ............... G06Q 30/0601 705/26.1 |
| 2009/0062000 A1 | 3/2009 | Tanaka |
| 2009/0113448 A1 | 4/2009 | Smith |
| 2009/0271821 A1* | 10/2009 | Zalewski ........... H04N 5/445 725/37 |
| 2011/0063415 A1* | 3/2011 | Gefen ............. H04N 21/8133 348/42 |
| 2014/0198103 A1 | 7/2014 | Johansson |
| 2014/0344725 A1 | 11/2014 | Bates |
| 2015/0024852 A1* | 1/2015 | Pacey ............... A63F 13/58 463/43 |
| 2016/0191671 A1 | 6/2016 | Dawson |
| 2017/0091992 A1 | 3/2017 | Rogers |
| 2017/0200301 A1 | 7/2017 | Boissé |
| 2019/0192970 A1 | 6/2019 | Garbut |
| 2019/0192972 A1 | 6/2019 | Garbut |
| 2019/0355331 A1 | 11/2019 | Wood |
| 2020/0001180 A1 | 1/2020 | Turner |
| 2020/0045285 A1 | 2/2020 | Varerkar |
| 2020/0269132 A1 | 8/2020 | Turner |
| 2020/0368616 A1 | 11/2020 | Delamont |
| 2021/0158597 A1 | 5/2021 | Hagland |
| 2021/0194794 A1 | 6/2021 | Turner |
| 2021/0329270 A1 | 10/2021 | Yea |

(56) References Cited

U.S. PATENT DOCUMENTS

| | | | |
|---|---|---|---|
| 2022/0019573 A1 | 1/2022 | Gautron | |
| 2022/0053224 A1 | 2/2022 | Katsumata | |
| 2022/0096931 A1 | 3/2022 | Raymond | |
| 2022/0096932 A1 | 3/2022 | Raymond | |
| 2022/0096933 A1 | 3/2022 | Raymond | |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Heok et al. "A Review on Level of Detail" Proceedings of the International Conference on Computer Graphics, Imaging and Visualization (CGIV'04) 2004 (Year: 2004).

Forsman, "Automatic LOD selection" Department of Science and Technology Linköping University Oct. 20, 2017 (Year: 2017).

Unity User Manual Apr. 2019 accessed from hhttps://web.archive.org/web/20200917105747/https://docs.unity3d.com/Manual/ classLODGroup.html andhttps://web.archive.org/web/20200921105526/ https://docs.unity3d.com/Manual/LevelOfDetail.html(Year: 2019).

* cited by examiner

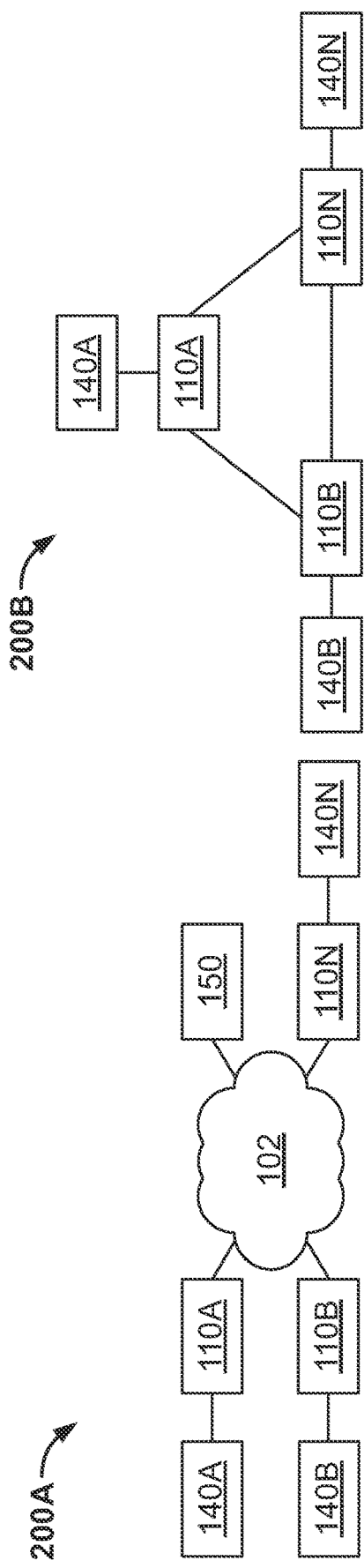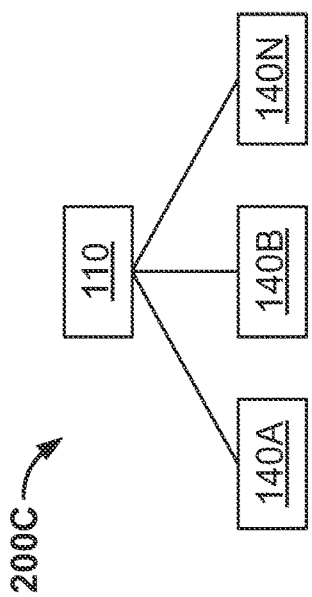

METHODS AND SYSTEMS FOR DYNAMICALLY SELECTING AND MODIFYING DIGITAL ASSETS WITHIN GAME ELEMENTS OF A MULTIPLAYER VIDEO GAME

CROSS-REFERENCE

The present application relies on, for priority, U.S. Patent Provisional Application No. 63/123,356, titled "Methods and Systems for Dynamically Selecting and Modifying Digital Assets Within Game Elements of a Multiplayer Video Game" and filed on Dec. 9, 2020. The above-referenced application is herein incorporated by reference in its entirety.

FIELD

The present specification discloses systems and methods for dynamically placing digital assets in multiplayer video gaming systems. More particularly, the present specification relates to dynamic asset placement in the actual landscape of a game map, based on a location, timing and/or action within a multiplayer video gaming system.

BACKGROUND

Multiplayer video games may provide mechanisms for the developer or third parties to include or display dynamic digital assets (e.g., messages, virtual objects, audiovisual content, etc.) to players in game. Conventionally, a multiplayer video game may comprise a game space, defined by a map establishing a virtual environment, and a plurality of fixed or interactive game elements, such as virtual characters, weapons, treasure, vehicles, buildings, and other objects. A dynamic asset, for example a message, may be delivered to a player by presenting a window or graphic overlaid on the game space that is clearly separate and distinct from the game space itself or between instances of actual gameplay.

Historically, game developers would integrate dynamic assets into the game itself such that they were fixed and were not changeable during the game. Subsequently, systems were developed that allowed for dynamically changing assets after the video game was published. Video games have also been developed that integrate assets into live streaming video games, akin to conventional television broadcasting.

However, known approaches to presenting dynamic assets in video games still suffer from drawbacks. First, dynamic assets often fail to effectively visually integrate into the game space, thereby looking like obvious intrusions into and distractions from, the gaming experience. Second, dynamic assets often fail to be suitably tailored to the game context itself and, as a result, add to the unnatural presentation of the asset.

Accordingly, there remains a need to optimize the selection, placement, and visual design of dynamic assets within multiplayer video games. There is also a need to manage third party messaging in a multiplayer video game environment based on one or more locations within the virtual environment, timing based on the gaming sequence and actions that are occurring with the virtual environment, and other player actions occurring in the video game environment, so as to maximize the visibility and impact on the players and spectators.

SUMMARY

The following embodiments and aspects thereof are described and illustrated in conjunction with systems, tools and methods, which are meant to be exemplary and illustrative, not limiting in scope.

In some embodiments, the present specification discloses a computer-implemented method for dynamically placing at least one digital asset within a game space of a multi-player video game, wherein the method is implemented in a computer having a processor and a non-transient memory, the method comprising: evaluating a scene of the game space to generate a score for the scene, wherein the score is based on at least one of historic data associated with the multi-player video game, real time data associated with the multi-player video game, or data related only to the scene; generating a graphical user interface to be displayed to a digital asset owner, wherein the graphical user interface is configured to visually provide, on the display, at least one of the scene or the score and to enable the at least one digital asset owner to associate the at least one digital asset with the score; determining suitability of the at least one digital asset to the scene; modifying the at least one digital asset and/or the score based on the determined suitability; and placing the at least one digital asset for display in the scene of the game space.

Optionally, the scene comprises a location within the game space.

Optionally, the scene comprises a location at a specified time within the game space.

Optionally, the game space comprises a plurality of game elements and wherein the plurality of game elements include at least one of landscapes, buildings, vehicles, billboards, storefronts, or fixed game elements.

Optionally, the at least one digital asset comprises at least one of an object, an image, a graphical, textual or video message, or an animated graphic.

Optionally, the method further comprises associating the score with a monetary value.

Optionally, the method further comprises storing the score in a memory in association with one of a plurality of tiers, where each of the plurality of tiers is associated with a monetary value.

Optionally, the method further comprises providing an input within the graphical user interface to receive a designation that associates the at least one digital asset with at least one of the plurality of tiers.

Optionally, evaluating the scene to generate the score comprises analyzing the scene using at least one feature of the scene. Optionally, the feature comprises at least one of locations or times of areas in the game space in which a traffic flow of virtual characters in the areas exceed a predefined threshold value. Optionally, the feature comprises at least one of locations and times of areas in the game space, wherein the areas have a degree of visibility to players in the game space or spectators viewing the players in the game space that exceeds a predefined threshold value. Optionally, the feature comprises at least one of a duration of exposure to players participating in the multi-player video game, a duration of exposure to spectators watching said players, a number or extent of obstructions positioned around said players, a viewing angle, a degree of lighting, a depth of the scene, or a size of an area available for the at least one digital asset. Optionally, the feature comprises at least one of a profile of a player participating in the game space or a profile of a spectator viewing the player participating in the game space.

Optionally, determining suitability of the at least one digital asset to the scene is achieved based on at least one of a size of the at least one digital asset, a subject matter of the at least one digital asset, or visual attributes of the at least one digital asset.

In some embodiments, the present specification discloses a digital asset server in data communication with a multi-player video game and configured to dynamically place at least one digital asset within a game space of the multi-player video game, wherein the digital asset server comprises a processor, a non-transient memory, and a plurality of programmatic instructions that, when executed by the at least one processor: evaluates a scene of the game space to generate a score for the scene, wherein the score is based on at least one of historic data associated with the multi-player video game, real time data associated with the multi-player video game, or data related only to the scene; generates a graphical user interface to be displayed to a digital asset owner, wherein the graphical user interface is configured to visually provide, on the display, at least one of the scene or the score and to enable the at least one digital asset owner to associate the at least one digital asset with the score; determines suitability of the at least one digital asset to the scene; modifies the at least one digital asset and/or the score based on the determined suitability; and places the at least one digital asset for display in the scene of the game space.

Optionally, the scene comprises a location within the game space.

Optionally, the scene comprises a location at a specified time within the game space.

Optionally, the game space comprises a plurality of game elements and wherein the plurality of game elements include at least one of landscapes, buildings, vehicles, billboards, storefronts, or fixed game elements.

Optionally, the at least one digital asset comprises at least one of an object, an image, a graphical, textual or video message, or an animated graphic.

Optionally, when executed by the at least one processor, the plurality of programmatic instructions associate the score with a monetary value.

Optionally, when executed by the at least one processor, the plurality of programmatic instructions store the score in association with one of a plurality of tiers, where each of the plurality of tiers is associated with a monetary value.

Optionally, when executed by the at least one processor, the plurality of programmatic instructions provide an input within the graphical user interface to receive a designation that associates the at least one digital asset with at least one of the plurality of tiers.

Optionally, when executed by the at least one processor, the plurality of programmatic instructions evaluate the scene to generate the score by analyzing the scene using at least one feature of the scene.

Optionally, the feature comprises at least one of locations or times of areas in the game space in which a traffic flow of virtual characters in the areas exceed a predefined threshold value. Optionally, the feature comprises at least one of locations and times of areas in the game space, wherein the areas have a degree of visibility to players in the game space or spectators viewing the players in the game space that exceeds a predefined threshold value. Optionally, the feature comprises at least one of a duration of exposure to players participating in the multi-player video game, a duration of exposure to spectators watching said players, a number or extent of obstructions positioned around said players, a viewing angle, a degree of lighting, a depth of the scene, or a size of an area available for the at least one digital asset.

Optionally, the feature comprises at least one of a profile of a player participating in the game space or a profile of a spectator viewing the player participating in the game space. Optionally, the plurality of programmatic instructions determine suitability of the at least one digital asset to the scene based on at least one of a size of the at least one digital asset, a subject matter of the at least one digital asset, or visual attributes of the at least one digital asset.

In some embodiments, the present specification discloses a computer-implemented method for dynamically placing at least one digital asset within a game space of a multi-player video game, the method being implemented in a computer having a processor and a random access memory, wherein the processor is in data communication with a display and with a storage unit, the method comprising: analyzing a scene to generate a dynamic score for the scene, wherein the dynamic score is based on at least one of a historic data, a real time data, or an estimated data related to the scene; generating a graphical user interface to be displayed to a digital asset owner, wherein the graphical user interface is configured to visually provide, on the display, a visual interface for displaying at least one of the scene and the score, and enabling the digital asset owner to associate the at least one digital asset with the score; determining suitability of the at least one digital asset to the scene; modifying at least one of the digital asset and the score based on the determined suitability; and placing the at least one digital asset for display in the scene of the virtual environment.

Optionally, the scene comprises a location within the virtual environment. Optionally, the scene comprises a combination of location and time within virtual environment.

Optionally, the virtual environment comprises game elements of a multiplayer video game.

Optionally, the at least one digital asset comprises at least one of an object, an image, a graphical, textual or video message, and an animated graphic.

Optionally, the dynamic score corresponds to a monetary value.

Optionally, the dynamic score is classified under one of multiple tiers, where each tier is associated with a monetary value.

Optionally, generating a graphical user interface comprises enabling the digital asset owner to associate the at least one digital asset with the at least one of the multiple tiers.

Optionally, analyzing a scene to generate a dynamic score for the scene comprises analyzing based on at least one feature of the scene. Optionally, the feature comprises at least one of locations and times of high traffic areas in the virtual environment. Optionally, the feature comprises at least one of locations and times of high visibility to at least one of players participating in the virtual environment and spectators viewing the players participating in the virtual environment. Optionally, the feature comprises at least one of duration of exposure to at least one of players and the spectators, obstructions for the players, viewing angle, lighting, depth of the scene, and size available for display of the message. Optionally, the feature comprises at least one of a profile of a player participating in the virtual environment and spectators viewing the players participating in the virtual environment.

Optionally, determining suitability of the message to the scene comprises determining based on at least one of a size of the message, a subject matter of the message, and a combination of visual attributes of the message.

In some embodiments, the present specification discloses a digital assets server configured with a computer-implemented method for dynamically placing at least one digital asset within a game space of a multi-player video game, the method being implemented in the digital assets server having a processor and a random access memory, wherein the processor is in data communication with a display and with a storage unit, the method comprising: analyzing a scene to generate a dynamic score for the scene, wherein the dynamic score is based on at least one of a historic data, a real time data, or an estimated data related to the scene; generating a graphical user interface to be displayed to a digital asset owner, wherein the graphical user interface is configured to visually provide, on the display, a visual interface for displaying at least one of the scene and the score, and enabling the digital asset owner to associate the at least one digital asset with the score; determining suitability of the at least one digital asset to the scene; modifying at least one of the digital asset and the score based on the determined suitability; and placing the at least one digital asset for display in the scene of the virtual environment.

Optionally, the digital assets server is in communication with a server configured to host the multi-player video game. Optionally, the scene comprises a location within the virtual environment. Optionally, the scene comprises a combination of location and time within virtual environment.

Optionally, the virtual environment comprises game elements of a multiplayer video game.

Optionally, the at least one digital asset comprises at least one of an object, an image, a graphical, textual or video message, and an animated graphic.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2A illustrates an exemplary system configuration in which a server hosts a plurality of computer devices to facilitate a multiplayer game, according to an implementation of the present specification;

FIG. 2B illustrates an exemplary system configuration in which a plurality of computer systems are networked together to facilitate a multiplayer game, according to an implementation of the present specification;

FIG. 2C illustrates an exemplary system configuration in which a computer system is used by a plurality of users to facilitate a multiplayer game, according to an implementation of the present specification;

DETAILED DESCRIPTION

Figure 1A:
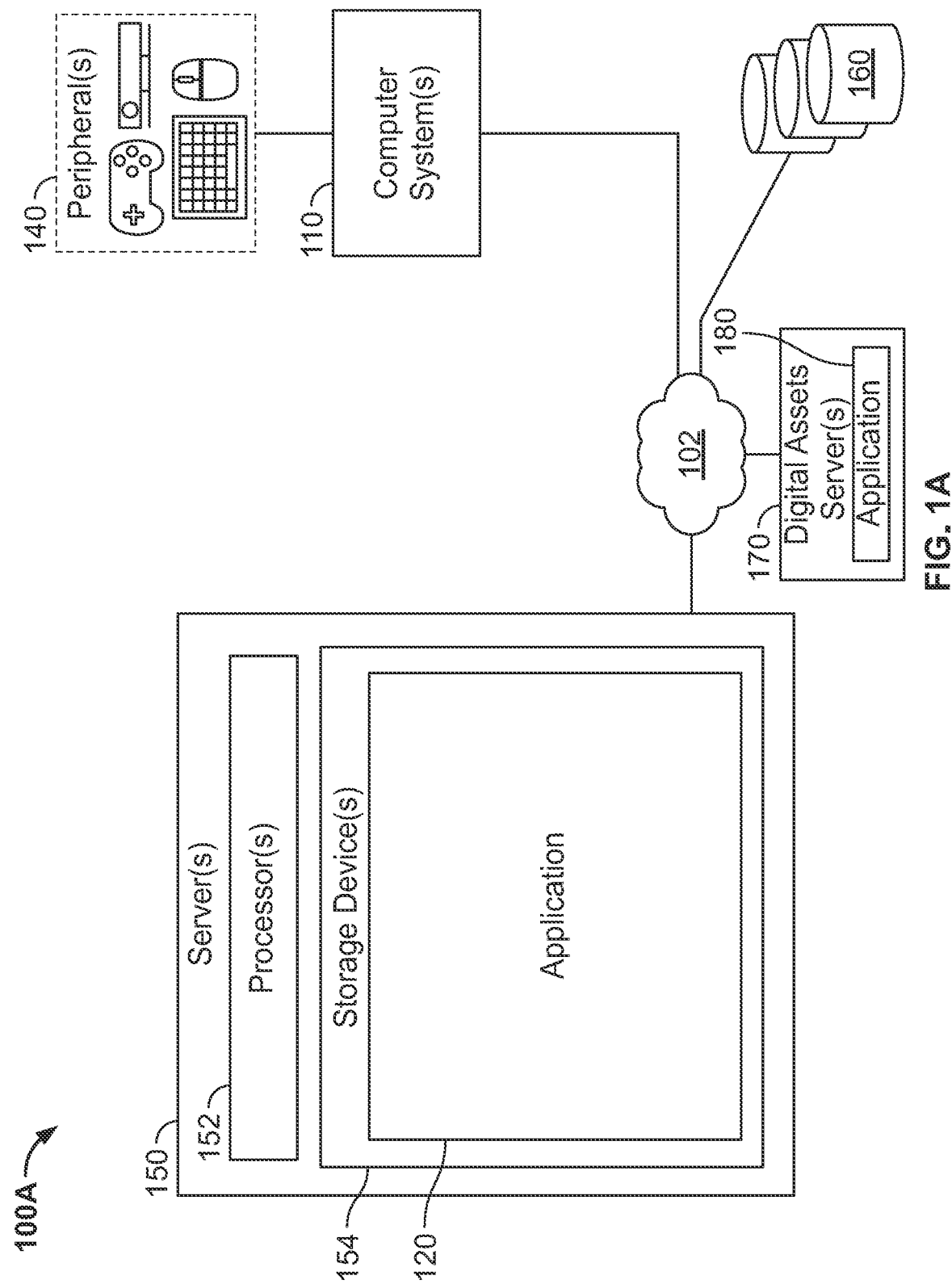
FIG. 1A is a block diagram of a system for providing multiplayer video games, according to one implementation of the present specification.

The present specification relates to dynamic placement of digital assets in a virtual environment, based on location, timing and player actions to maximize the visibility and impact on the users.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

The embodiments disclosed herein are directed to an improvement in computer-related technology (enabling computers to enable improved gaming experiences in an online multiplayer gaming environment), and thus do not recite abstract ideas or concepts. The improved computing gaming experiences are achieved through the use of specific rules to collect and evaluate player data within the gaming environment which, when executed, enable the automation of specific content generation, and other gaming experiences that previously were not available or could not be automated. These new computer gaming rules improve existing technological processes in gaming and product placement and, therefore, are not abstract or conceptual in nature. This specification therefore teaches how the disclosed inventions improve a gaming technology using a specific set of rules, and particular solutions to the aforementioned failures in conventional gaming systems to achieve the desired outcomes.

While aspects of the present specification may be described herein with reference to various game levels or modes, characters, roles, game items, and any other characteristic associated with a particular genre of video game, it should be appreciated that any such examples are for illustrative purposes only, and are not intended to be limiting. The dynamic asset placement system and method described in detail herein may be used in any genre of video game or any kind of a virtual environment, without limitation.

The terminology used within this specification and detailed description of the various embodiments is for the purpose of describing particular embodiments only and is not intended to limit the invention.

As used herein, the term "a multiplayer game environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multiplayer game environment or massively multiplayer online game is a computer-related technology, a non-generic technological environment, and should not be abstractly considered a generic method of organizing human activity divorced from its specific technology environment.

The term "dynamic assets", "dynamic digital asset", "digital asset" and "message" may be used interchangeably and is construed to mean an object, an image, a graphical, textual or video message, or an animated graphic, including and not limited to a message of public interest issued by an authority, a message issued by the developer of the game, a message relating to a third party or a third party's products or services, or any other type of digital asset including at least one or several of text, graphics, audio and video that is displayed in particular locations and at particular times in a virtual environment of a game to be seen by human players and/or human spectators of the virtual game.

In some embodiments, a "third party digital asset owner" is external to the publisher of the video game and dynamically provides the digital asset via servers that are separate and distinct from the servers of the video game publisher or the servers that host the video game.

The term "game space" refers to the virtual landscape of a video game, including all interactive and non-interactive objects within the virtual landscape, that the virtual character, or avatar, of a human player may engage with or otherwise view while actually playing a game. It does not include the images, video, or text that may be shown in a graphical user interface of a video game before a game, after a game, while a game is paused, or around the borders of the game and outside the actual virtual environment of the game.

The term "dynamically place" refers to the automated placement of a digital asset into a scene without requiring a manual action by a human to select the location or specifically cause the asset to be associated with the selected location.

Exemplary System Architecture

Figure 1B:
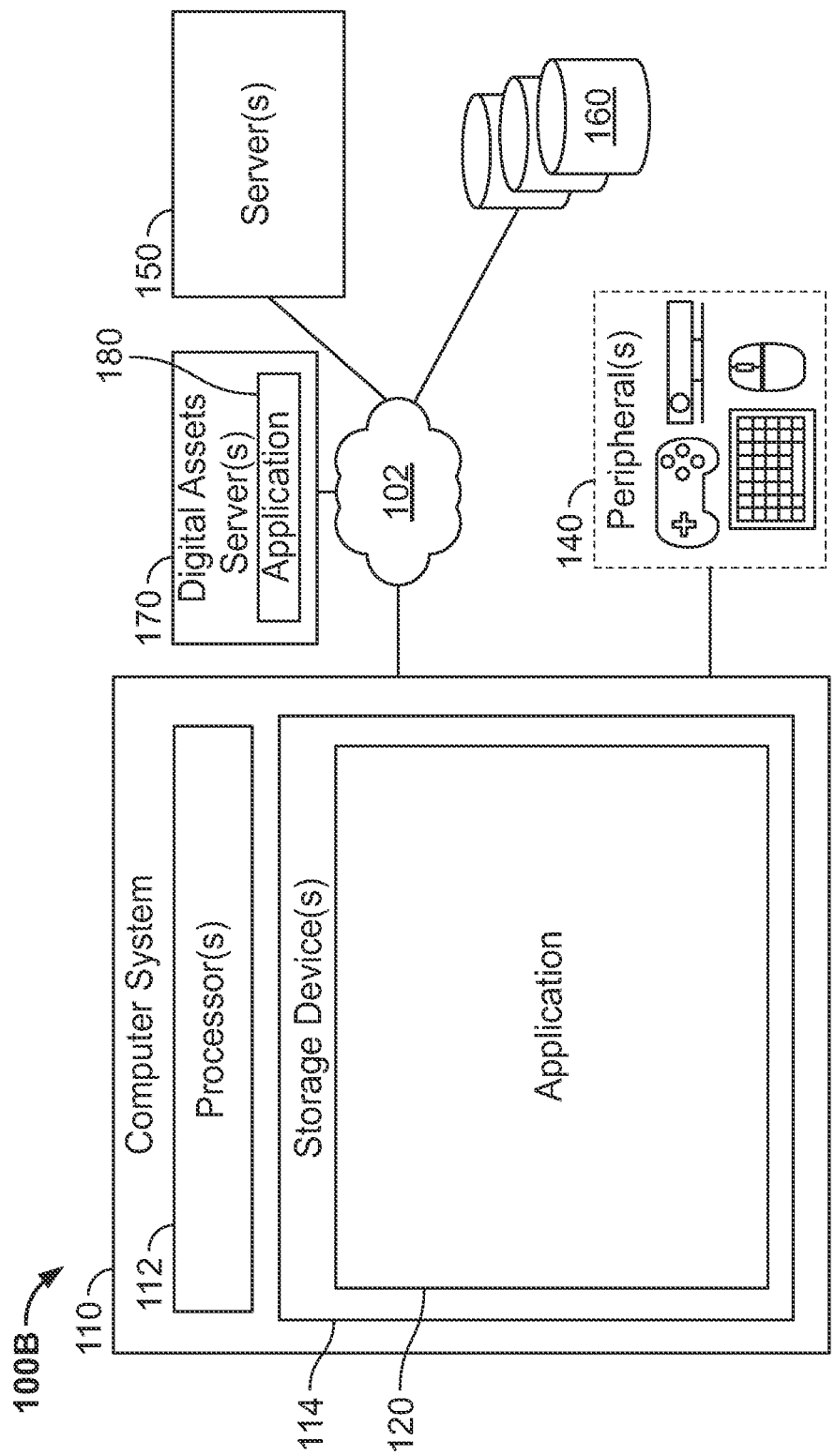
FIG. 1B is a block diagram of another system for providing multiplayer video games, according to one implementation of the present specification.

FIGS. 1A and 1B illustrate systems for providing multiplayer video games, according to some implementations of the present specification, referred to as a multiplayer game environment or multiplayer gaming environment. FIG. 1A illustrates an implementation in which server(s) 150 function as a host computer that hosts gameplay between other devices, such as computer system(s) 110. FIG. 1B illustrates an implementation in which a given computer system 110 functions as a host computer that hosts gameplay between (or with) other devices, such as other computer system(s) 110. Server(s) 170 function as an interface between server(s) 150 and third party providers or owners to digital assets. Unless specifically stated otherwise, the description of various system components may refer to either or both of FIGS. 1A and 1B.

System 100 may be used to implement various embodiments described in subsequent sections of the present specification. For example, system 100 may implement various programs that result in more optimal placement of a digital asset in a virtual environment or greater outreach of a message to the participants of a virtual environment, including but not limited to players and spectators in a virtual gaming environment. In one implementation, system 100 may include one or more computer systems 110, one or more servers 150, one or more servers 170, one or more databases 160, and/or other components.

Computer system 110 may be configured as a gaming console, a handheld gaming device, a personal computer (e.g., a desktop computer, a laptop computer, etc.), a smartphone, a tablet computing device, a smart television, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store one or more applications 120), one or more peripherals 140, and/or other components. Processors 112 may be programmed by one or more computer program instructions. For example, processors 112 may be programmed by application 120 and/or other instructions (such as gaming instructions used to instantiate the game).

Depending on the system configuration, application 120 (or portions thereof) may be part of a game application, which creates a game instance to facilitate gameplay. Alternatively or additionally, application 120 may run on a device such as a server 150 to perform its designated function(s) for users in an "online" game hosted by server 150.

Application 120 may include instructions that program computer system 110, each of which are described in greater detail herein. As used herein, for convenience, the various instructions will be described as performing an operation, when, in fact, the various instructions program the processors 112 (and therefore computer system 110) to perform the operation.

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from and/or relating to a player. Peripherals 140 may be coupled to a corresponding computer system 110 via a wired and/or wireless connection.

Server 150 may include one or more computing devices. Referring back to FIG. 1A, Server 150 may include one or more physical processors 152 (also interchangeably referred to herein as processors 152, processor(s) 152, or processor 152 for convenience) programmed by computer program instructions, one or more storage devices 154 (which may store an application 120), and/or other components. Processors 152 may be programmed by one or more computer program instructions. For example, processors 152 may be programmed by gaming instructions used to instantiate the game. Server 170 may include one or more computing devices. Server 170 may include one or more physical processors programmed by computer program instructions, one or more storage devices, and/or other components. The processors of server 170 may be programmed by one or more computer program instructions.

Depending on the system configuration, application 120 (or portions thereof) may be part of a game application, which creates a game instance to facilitate gameplay. Alternatively, or additionally, portions or all of application 120 may run on computer system 110 or server 150. Application 120 may include instructions that program server 150 to perform various operations, each of which are described in greater detail herein. As used herein, for convenience, the various instructions will be described as performing an operation, when, in fact, the various instructions program the processors 152 (and therefore server 150) to perform the operation.

Depending on the system configuration, an application 180 (or portions thereof) may be part of a game application, or may be separate from the game application but in communication with the game application, which creates and positions dynamic assets within the game space. Alternatively, or additionally, portions or all of application 180 may run on a computer system in communication with server 170. Application 180 may include instructions that program server 170 to perform various operations, each of which are described in greater detail herein. As used herein, for convenience, the various instructions will be described as performing an operation, when, in fact, the various instructions program the processors (and therefore server 170) to perform the operation.

Although illustrated in FIGS. 1A and 1B as a single component, computer system 110 and servers 150, 170 may each include a plurality of individual components (e.g., computer devices) each programmed with at least some of the functions described herein. In this manner, some components of computer system 110 and/or servers 150, 170 may perform some functions while other components may perform other functions, as would be appreciated. The one or more processors (112, 152) may each include one or more physical processors that are programmed by computer program instructions. Thus, either or both server 150 and computer system 110 may function as a host computer programmed by application 120. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIGS. 1A and 1B as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

The various instructions described herein may be stored in a storage device (114, 154) which may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

FIG. 2A illustrates an exemplary system configuration 200A in which a server hosts a plurality of computer devices to facilitate a multiplayer game, according to an implementation of the present specification. In one implementation, one or more servers 150/170 (illustrated in FIGS. 1A and 1B) may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of applications 120/180 (illustrated in FIGS. 1A and 1B).

In some instances, a given server 150 may be associated with a proprietary gameplay network system, such as, without limitation, the Sony PlayStation® Network, Microsoft Xbox Live®, and/or any other gameplay network system. In this implementation, a given computer system 110 may be associated with a particular type of gaming console. Other types of computer systems 110 using other types of gameplay networks may be used as well.

FIG. 2B illustrates an exemplary system configuration 200B in which a plurality of computer systems 110 are networked together to facilitate a multiplayer game, according to an implementation of the present specification. Any one or more of the computer devices 110 may serve as a host and/or otherwise provide one or more operations of applications 120/180 (illustrated in FIGS. 1A and 1B).

FIG. 2C illustrates an exemplary system configuration 200C in which a computer system 110 is used by a plurality of users to facilitate a multiplayer game, according to an implementation of the present specification. In an implementation, computer system 110 may be considered to host the multiplayer game and/or otherwise provide one or more operations of applications 120/180 (illustrated in FIGS. 1A and 1B).

Referring to FIGS. 2A-2C, simultaneously, in an implementation, a host may facilitate the multiplayer game by sending invitations to one or more contacts through social groups, to play the game and/or performing other operations described herein. In an implementation, at least some of these operations may also or instead be performed by one or more individual computer systems 110. Furthermore, the illustrated system configurations are exemplary only and should not be viewed as limiting in any way. Other system configurations may be used as well, as would be appreciated by those having skill in the art.

Selecting and Modifying Messaging Within Game Elements

In some embodiments, a "third party digital asset owner" is external to the publisher of the video game and dynamically provides the digital asset via servers 170 that are separate and distinct from the servers 150 of the video game publisher or the servers 150 that host the video game. However, servers 150 and 170 may communicate with each other over network 102, as discussed in FIGS. 1A and 1B. Application 180 is a part of digital assets server 170 and may be in communication with server 150. Application 180 implements a scoring system and method for determining value of placing a dynamic asset in a game space, such as the gaming environment hosted by server 150 or computer system 110. Application 180 scores value of the message for a particular location and a particular time based on a potential or a determined set of parameters relating to visibility, exposure, impressions, attributes of the product, and other attributes of the game space itself. As further discussed below, the set of parameters are determined using multiple tools including but not limited to, analysis of historic data for a particular area of the game space, analysis of post-match event data, and/or advanced or real-time analysis of in-game action. The scores are dynamic, and are based on updates to game data during and after a gaming session.

Locations of the dynamic assets are ranked or classified in multiple tiers based on the determined scores. A Graphical User Interface (GUI) is presented to an owner of the digital asset through a computer system 110. The digital asset owner, interfacing through the GUI, may specify one or more tiers that they want for placing their digital assets. In some embodiments, the GUI enables the digital asset owners to view and filter different digital asset placement locations from a perspective of a match or a gaming level or the game. In some embodiments, the digital asset owners may place a request for the selected tiers in advance, before the game begins.

As further discussed below, application 180 is also configured to filter or evaluate messages for chosen locations in the game space, before adding them to the game space. In some embodiments, application 180 is programmed to modify a message provided by the digital asset owner, so as to suit the digital asset's display to a particular time, location, or event in the game space. In an example, a digital asset pertaining to a car is rendered to be light and bright if placed on a billboard game element during the daytime but that same digital asset would be modified to be dark and textured if integrated into a mountainside, within the game space. Application 180 could also make recommendations to the digital asset owner based on the nature and content of a digital asset for suitable locations in the game space. One example of a recommendation is a match based on the nature of the digital asset and the nature of the location. In an example, a digital asset, such as a message, pertaining to a movie is recommended to be placed on the marquee of a theatre in the game space, or a digital asset pertaining to or recommending a snack food may be placed in the window of a convenience store in the game space. Other recommendations would be based on the game action at the virtual location in the game space. Therefore, if the virtual location is a high traffic choke point with a lot of fast action, it may be recommended that a digital asset relating to an action sport brand, product or service be placed, but if the virtual location is typically associated with slower action, digital assets for other, more relevant brands, products, or services may be recommended. The digital asset owner may choose to accept the recommendations.

Application Architecture

Figure 3:
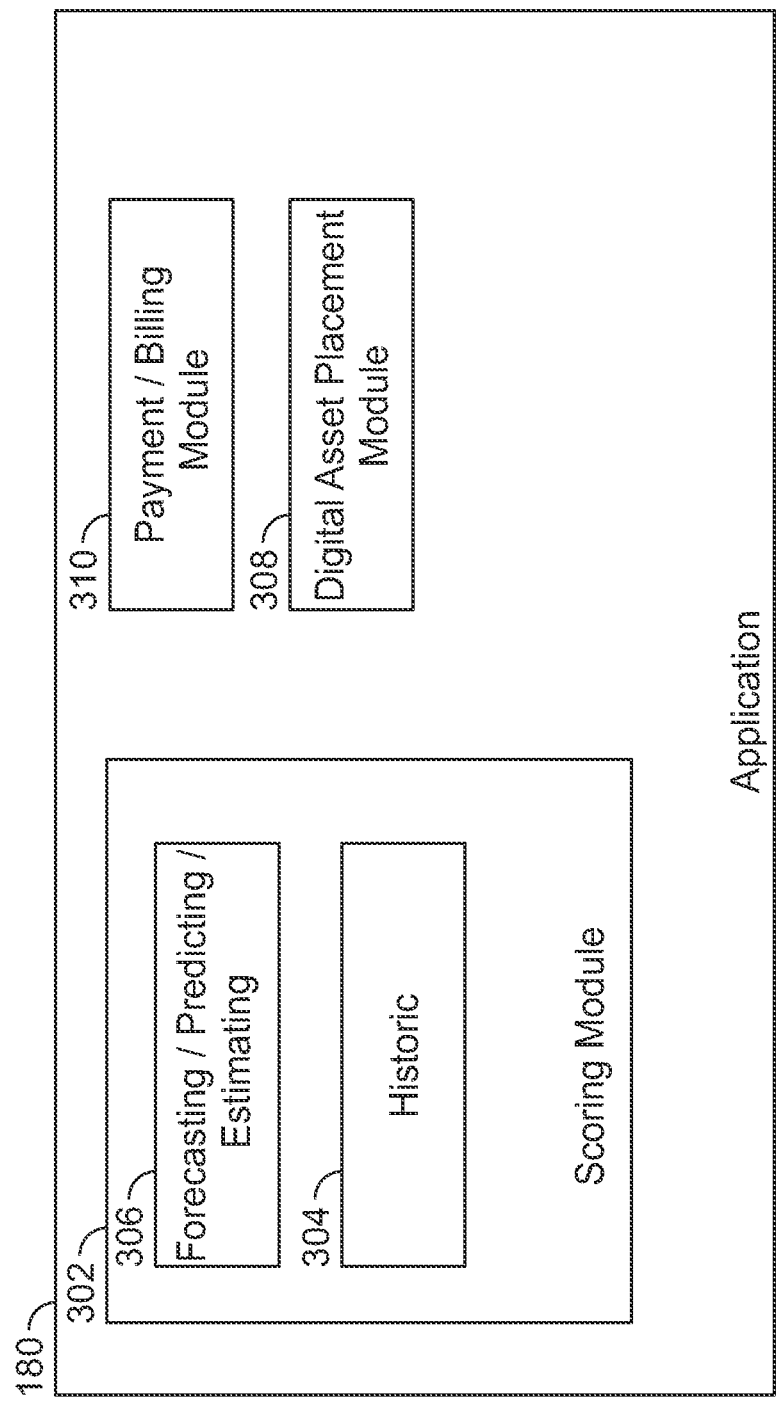
FIG. 3 illustrates an exemplary set of modules implemented by the application described in context of FIGS. 1A and 1B, in accordance with some embodiments of the present specification.

FIG. 3 illustrates an exemplary set of modules implemented by application 180 described in the context of and with reference to FIGS. 1A and 1B, in accordance with some embodiments of the present specification. In some embodiments, application 180 provides or implements a plurality of modules, such as, but not limited to a scoring module 302 comprising a module 304 that calculates scores based on historic data and a module 306 that calculates scores in real time or based on estimations for future data, a digital asset placement module 308, and a payment or billing module 310. It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game and business database system 160, and executed by a processor. It should be appreciated that one of ordinary skill in the art would understand that the term "real-time", relative to the term "historical data", means that the data is being generated substantially concurrently, e.g. within an hour or less, of the scoring module calculations.

In some embodiments, module 302 is configured to access information pertaining to a game space. The information includes, and is not limited to a map showing multiple locations within the game space, game-data of the game(s) that was played within the game space, and data pertaining to the action or events that take place during the game played in the game space. The accessed information provides a specialized and organized format for presenting, processing, retrieving, and storing data associated with each game space so as to determine one or more scores.

Module 304 uses historic data including post-match event data and historic data for a map of the virtual environment. In embodiments, the historical data is constantly updated with new game data.

Module 306 may use real-time analysis of in-game action to predict scores. In embodiments, machine learning techniques are used to improve predictions. In an example, various weighted factors are used for predicting high traffic areas of a given map. New game data is used to "learn" and refine what weight should be given to these various factors.

The factors, used by modules 304 and 306, may include historical traffic patterns that indicate locations in the map that witness action. The data may include traffic patterns that also indicate areas within the map where players have stayed or are likely to stay for a prolonged period of time. Additional factors may include places and times with high visibility to the players and/or spectators. The identification of such places and times may be based on obstructions encountered by players, camera angle, lighting, depth in a scene, size of the location in which the digital asset can be displayed, among other parameters. Areas where obstructions are encountered by the players are likely to witness relatively higher traffic as compared to areas without obstructions where the players move ahead with speed. Similarly, a camera angle that focuses on a certain area within the map is likely to offer greater visibility to a digital asset, relative to an area that is not central to the camera's viewing field. The other factors are similarly applied to establish and predict the scores of places and times with high visibility to the players and/or spectators. Some additional examples of the factors used by modules 304 and 306 may include team composition, map layout, player profiles indicating tendencies and gaming patterns for each player.

In another case, a scene is analyzed for optimal camera angle and the scene is further analyzed for optimal digital asset placement within the scene based on relevance to an action in the scene, and discreet and seamless placement within the scene so as not to detract from the visual integrity of the gameplay.

Module 302 may combine the scores analyzed by modules 304 and 306, to determine an overall score for digital asset placement for display within the virtual environment of the game space. In an embodiment, the score is analyzed based entirely on the amount of time a virtual location is within the field of view of players. In another embodiment, the score is analyzed by combining the amount of time the virtual location is within the field of view of the players with an offset/reduction for the time the player is moving quickly or engaged in action that would detract from their ability to perceive the digital asset. In another embodiment, the score is analyzed by increasing a placement (of the digital asset) score based on the game action experienced by the player. In this embodiment, if the virtual location is a spawn point, it could receive a higher score. If the virtual location is a key goal in the game, such as but not limited to an enemy base or a flag, it could receive a higher score.

In some embodiments, scores are additionally based on timing in the game and how close the game is near the end of the game session. For a time that is closer to the end of the game session, the score may be higher.

A higher score may indicate a higher value for placing a digital asset at a particular location and at a particular time within the game space, whereas a low score may indicate a lower value of placing the digital asset at a particular location and at a particular time, within the game space. Here, the value may be associated with a monetary value that is paid by the digital asset owner for placing their digital asset in the game space. In embodiments, module 302 determines the scores for the digital asset for a particular location and a particular time based on potential (i.e., predicted) or determined (i.e., actual) metrics used respectively by modules 306 and 304.

The scores provided by module 302 are used by a digital asset placement module 308 to determine a suitability of a message for placing the message into a scene. The scene is defined by, among other properties, a location or an area within the game space and a time at which the scene is executed. Location is used to specify an area/volume of the in-game world (world coordinates) in the game space. For example, locations can include 2D areas on a wall, billboard, sign, storefront, television, or other flat surface in the game space. Locations can also include 3D areas/volumes such as a space on a table, in a store or mall, in a restaurant, or any other space in the game space. The location can be defined by the world coordinates so that placing a message would be similar to placing a 2D texture or a 3D object in the game space. Module 308 classifies each scene that may be appropriate for placement of a digital asset, in to one or more tiers or ranks, based on the scores. The scores are dynamic and may be based on the determined and estimated features of a game taking place within the game space. As a result, the tiers or ranks for each scene may change over time. Each tier corresponds to a different value for digital asset placement in the given game space. The tiers and their associated values are made available to digital asset owners through a graphical user interface.

The digital asset owners may specify in advance which tiers they want for placing their digital assets in the game space. Additionally, the digital asset owners may request specific placements using a GUI that allows for viewing and filtering different digital asset placement locations from a match/level/game within the game space. The digital asset placement module 308 is configured to receive one or more digital assets from digital asset owners through the GUI. The digital asset is characterized by its size, nature of product being showcased, combination of colors, combination of text and images, among other characteristics.

In embodiments, the scores provided by module 302 may be modified further by module 308, based on an analysis of compatibility of a received digital asset with a particular scene. In one example, the score and therefore the value of a scene for a digital asset that is relatively more suited to that scene, is high, and vice-versa for a digital asset that is relatively less suited to the same scene. The analysis for determining the suitability of the received digital asset to a scene is based on at least one or more of the following:

In one embodiment, the suitability of the digital asset for the scene is rated based on a size of the digital asset and the location. For example, a digital asset may be constrained to some size or range of sizes to be ideally viewed on screen, while a location for placing the digital asset may have specific size or ideal range of sizes as well. Module 308 rates a given digital asset's suitability for the scene based on a comparison of these parameters.

In another embodiment, the suitability of the digital asset for the scene is rated based on the color palettes use in the digital asset and the scene. In an example, certain colors may not be visually pleasing for a certain scene, whereas other colors may blend in better. In another example, a visually noisy or colorful message is determined to be a poor fit to put on a wall in a plain grey room in a scene.

Therefore, the above two parameters are examples of comparing visual aspects of the digital asset to the visual parameters of the scene to determine whether the digital asset is suitable for that scene.

In another embodiment, a rating for the suitability of the digital asset for a scene is based on the subject matter of the digital asset and the scene. In an example, a food-related digital asset for product placement may be highly rated for a scene relating to food. Such a scene may include locations such as a restaurant, a grocery store, a food court, among other food-related locations in the game space. The same food related digital asset, however, may be rated as lower in a scene unrelated to food, including scenes at locations of a military base, an outdoor/underwater scene, and the like.

In another embodiment, a rating for the suitability of the digital asset for the scene is based on the duration of the scene. In one example, if a determination is made that players are typically sprinting through a location then it may generally be ranked lower in terms of suitability for digital assets compared to a location where players are spending more time or not moving as quickly through the scene. In another embodiment, the suitability of the digital asset for the scene is rated based on the visibility of the scene. The visibility of the scene may be based on a combination of features such as, camera angle, obstructions, lighting, and anything else that may affect the player's viewing of the location.

In yet another embodiment, the suitability of the digital asset for the scene is rated based on the nature and type of activity taking place (currently or historically) in the virtual location of the scene, either for an individual player or for a set of players. For example, displaying a digital asset representing athletic gear in a sports game may be rated as highly compatible or the same digital asset may also be rated as highly compatible in another game genre, but for specific players who have a demonstrated preference for sports gear.

In some embodiments, module 308 is configured to use the rating of compatibility of the digital asset for a scene to make recommendations of the most suitable scenes to the advertisers. In some embodiments, module 308 is configured to modify visual aspects of the digital asset to increase its rating of suitability to certain scenes. The digital assets may be customized by module 308, or custom digital assets may be provided by digital asset owners for a scene, where the customization is based on the profiles of each player and spectators. The ability to customize the digital assets indicates dynamic characteristics of the digital assets.

A module 310 is configured to determine the values of various choices of dynamic asset placement available to digital asset owners and enable the owners to perform transactions associated with their choices. The value of a scene is modified based on the dynamics of actual game play in the game space, so that a scene which may start with an initial default value (high) may actually decrease because, in actual game play, the game element associated with that digital asset placement location is not frequently encountered, and vice-versa. Similarly, the value is modified based on the player or group of players, since the knowledge of game play style of specific players enables the knowledge of which game elements associated with a given dynamic asset placement location would receive greater or fewer impressions from those players. The dynamic nature of the value of a scene is specifically applicable to the scenes for which the values are based on estimated scores, predicted by module 306. In embodiments where a digital asset owner has paid for a scene based on a projected value of the scene and there is a discrepancy with the actual value, module 310 is configured to credit or refund the digital asset owner after the discrepancy has occurred. In some embodiments, the digital asset owner only gets a refund if the value goes down, and is not charged more if the value goes up. Alternatively, module 310 is configured such that the digital asset owner pays for the scene after the game so the actual value is used. Alternatively, the digital asset owner can pay based on the projected value and assume some risk that the actual value might change (for better or worse). Different types of transactional models may be adopted by module 310. Additionally, the payment models may be based on cost of each click or impression for a dynamic asset, or based on a flat rate, or based on a cost only if the numbers of clicks or impressions are above a predefined threshold, or any other.

The GUI provided to the digital asset owners enables them to conduct the transactions with the server 170. The GUI may enable a digital asset owner to visualize the game elements (billboards, sides of buildings, sides of vehicles, terrain, others) and how their digital asset would visually change based on camera angles, time of day, weather, among other factors discussed above.

Figure 4:
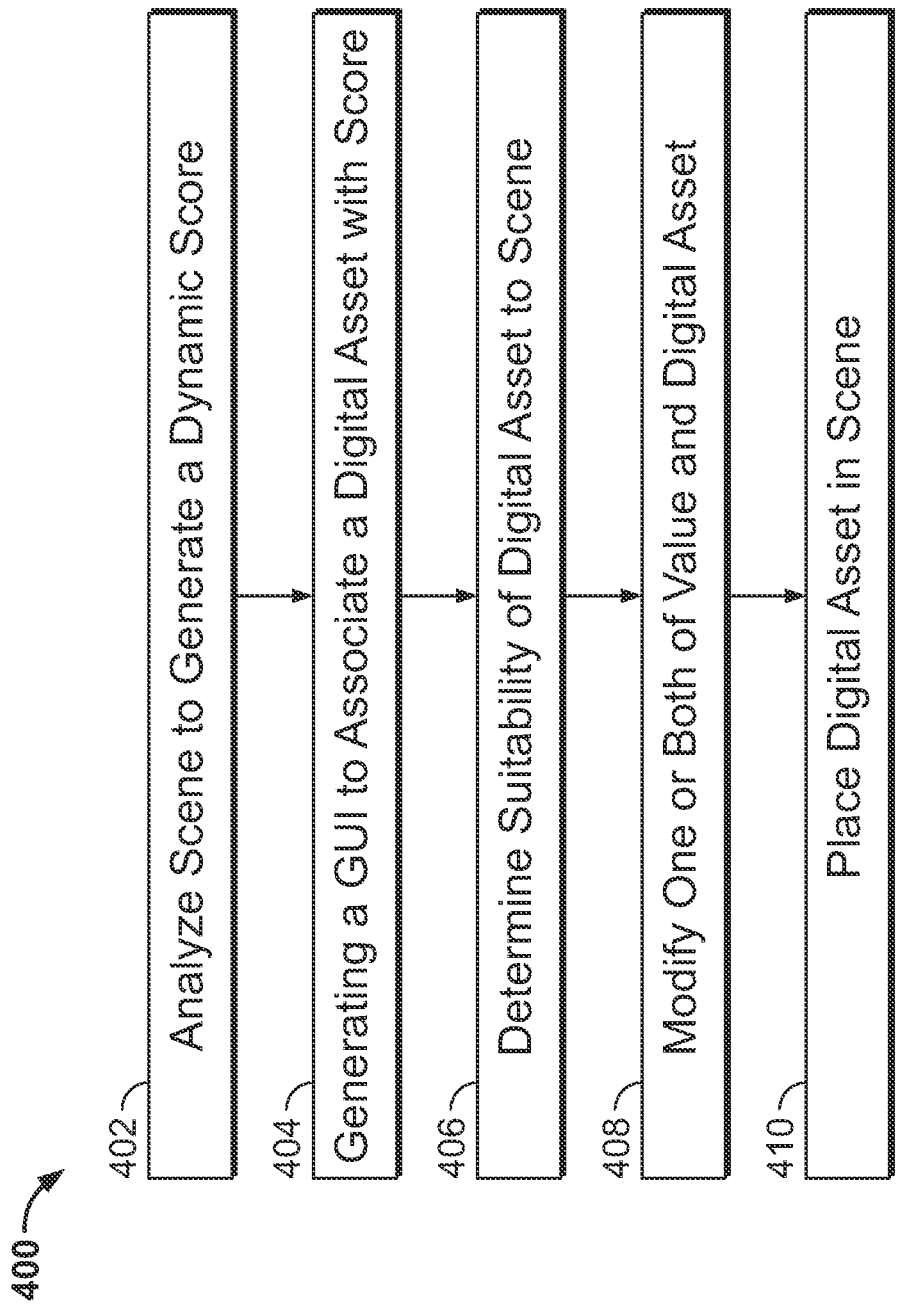
FIG. 4 is a flow chart illustrating a process for dynamically selecting and modifying digital assets within a virtual environment, in accordance with some embodiments of the present specification.

FIG. 4 is a flow chart illustrating a process for dynamically placing digital assets (such as selecting and modifying messaging) within a game space, in accordance with some embodiments of the present specification. In embodiments, the process is configured to be implemented by a combination of modules implemented by application 180, for a multiplayer video game. At step 402, a scene is analyzed to generate a dynamic score for the scene. The dynamic score is based on at least one of a historic data, a real time data, and an estimated data related to the scene. The historic data is continuously updated with new game data and machine learning techniques are used to improve estimations. The updates are provided in real time and/or after a game event. The scores are generated based on multiple factors that may be weighted for predicting high traffic areas of a given map such as historical traffic patterns, team composition, map layout, player profiles/tendencies/patterns, visibility of a scene, obstructions, camera angle, lighting, depth of scene, among others. The system can use new data to "learn" and refine what weight should be given to these factors, while determining a score. Each score may be classified or ranked in one of pre-defined tiers. Each tier may be associated with a monetary value for placing a digital asset in the scene. The term data related only to a first scene means that the referenced data does not include data specific to scenes other than the first scene but may include data common to the first scene and the other scenes.

At step 406, a graphical user interface (GUI) is generated for display to a digital asset owner. The owner may specify in advance which tier is preferred for placing a digital asset in the game space. Additionally, the digital asset owner may request specific placements using the GUI that allows for viewing and filtering different digital asset placement locations from a match/level/game within the game space. The digital asset placement module 308 is configured to receive one or more digital assets from the digital asset owner through the GUI. The digital asset is characterized by its size, nature of product being showcased, combination of colors, and combination of text and images, among other characteristics.

At step 408, a suitability of the digital asset for placing it within the scene is determined. Module 308 is configured to use a rating of suitability or compatibility of the digital asset for a scene to make recommendations of the most suitable scenes to the digital asset owner for the digital asset. In some embodiments, module 308 is configured to modify visual aspects of the digital asset to increase its rating of suitability to the scene. The digital asset is rendered dynamic through customizing by module 308, or a customized digital asset may be provided by the digital asset owner for the scene, where the customization is based on the profiles of players and spectators of the game.

At step 410, either or both of the digital asset and the score are modified based on the determined suitability. The score and therefore the value of the scene for the digital asset that is relatively more suited to that scene, is high, and vice-versa for a digital asset that is relatively less suited to the same scene. The value of placing the digital asset within the scene is presented to the digital asset owners and is used to perform a transaction associated with it. The value of the scene is modified based on the dynamics of actual game play in the game space, so that a scene which may start with an initial default value (high) may actually decrease because, in actual game play, the game element associated with that digital asset placement location is not frequently encountered, and vice-versa. Similarly, the value is modified based on the player or group of players, since the knowledge of game play style of specific players enables the knowledge of which game elements associated with a given digital asset placement location would receive greater or fewer impressions from those players. The dynamic nature of the value of a scene is specifically applicable to the scenes for which the values are based on estimated scores, predicted by module 306. In embodiments where a digital asset owner has paid for a scene based on a projected value of the scene and there is a discrepancy with the actual value, module 310 is configured to credit or refund the advertiser after the discrepancy has occurred. In some embodiments, the digital asset owner only gets a refund if the value goes down, and is not charged more if the value goes up. Alternatively, module 310 is configured such that the digital asset owner pays for the scene after the game so the actual value is used. Alternatively, the digital asset owner can pay based on the projected value and assume some risk that the actual value might change (for better or worse). Different types of transactional models may be adopted. Additionally, the payment models may be based on cost of each click or impression for a digital asset, or based on a flat rate, or based on a cost only if the numbers of clicks or impressions are above a predefined threshold, or any other. At step 412, the digital asset is placed for display in the scene of the virtual environment. The digital asset is available for display to players and spectators of the game. In some embodiments, different digital assets are displayed to players and to spectators, based on the customizations implemented at steps 406 and 408.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A computer-implemented method for dynamically placing at least one digital message within a game space of a multi-player video game, wherein the method is implemented in a computer having a processor and a non-transient memory, the method comprising:
   evaluating a scene of the game space to generate a score for the scene, wherein the score is based on at least one of historic data associated with the multi-player video game, real time data associated with the multi-player video game, or data related only to the scene and wherein said scene is defined by objects other than virtual characters;
   generating a graphical user interface to be displayed to a digital asset owner, wherein the graphical user interface is configured to visually provide, on the display, at least one of the scene or the score and to enable the at least one digital asset owner to associate the at least one digital message with the score;
   determining suitability of the at least one digital message to the scene;
   modifying the at least one digital message based on the determined suitability; and
   placing the modified at least one digital message for display in or on at least one of the objects.

2. The computer-implemented method of claim 1, wherein the scene comprises a location within the game space.

3. The computer-implemented method of claim 2, wherein the scene comprises a location at a specified time within the game space.

4. The computer-implemented method of claim 1, wherein the objects include at least one of landscapes, buildings, vehicles, billboards, storefronts, or fixed game elements.

5. The computer-implemented method of claim 1, wherein the at least one digital message comprises at least one of an image, a graphical, textual or video message, or an animated graphic.

6. The computer-implemented method of claim 1, further comprising associating the score with a monetary value.

7. The computer-implemented method of claim 1, further comprising storing the score in a memory in association with one of a plurality of tiers, where each of the plurality of tiers is associated with a monetary value.

8. The computer-implemented method of claim 7, further comprising providing an input within the graphical user interface to receive a designation that associates the at least one digital message with at least one of the plurality of tiers.

9. The computer-implemented method of claim 1, wherein evaluating the scene to generate the score comprises analyzing the scene using at least one feature of the scene.

10. The computer-implemented method of claim 9, wherein the feature comprises at least one of locations or times of areas in the game space in which a traffic flow of virtual characters in the areas exceed a predefined threshold value.

11. The computer-implemented method of claim 9, wherein the feature comprises at least one of locations and times of areas in the game space, wherein the areas have a degree of visibility to players in the game space or spectators viewing the players in the game space that exceeds a predefined threshold value.

12. The computer-implemented method of claim 9, wherein the feature comprises at least one of a duration of exposure to players participating in the multi-player video game, a duration of exposure to spectators watching said players, a number or extent of obstructions positioned around said players, a viewing angle, a degree of lighting, a depth of the scene, or a size of an area available for the at least one digital message.

13. The computer-implemented method of claim 9, wherein the feature comprises at least one of a profile of a player participating in the game space or a profile of a spectator viewing the player participating in the game space.

14. The computer-implemented method of claim 1, wherein determining suitability of the at least one digital message to the scene is achieved based on at least one of a size of the at least one digital message, a subject matter of the at least one digital message, or visual attributes of the at least one digital message.

15. A digital asset server in data communication with a multi-player video game and configured to dynamically place at least one digital message within a game space of the multi-player video game, wherein the digital asset server comprises a processor, a non-transient memory, and a plurality of programmatic instructions that, when executed by the at least one processor:

evaluates a scene of the game space to generate a score for the scene, wherein the score is based on at least one of historic data associated with the multi-player video game, real time data associated with the multi-player video game, or data related only to the scene and wherein said scene is defined by objects other than virtual characters;

generates a graphical user interface to be displayed to a digital asset owner, wherein the graphical user interface is configured to visually provide, on the display, at least one of the scene or the score and to enable the at least one digital asset owner to associate the at least one digital message with the score;

determines suitability of the at least one digital message to the scene;

modifies the at least one digital message based on the determined suitability; and places the modified at least one digital message for display on or in at least one of the objects of the game space.

16. The digital asset server of claim 15 wherein the scene comprises a location within the game space.

17. The digital asset server of claim 16, wherein the scene comprises a location at a specified time within the game space.

18. The digital asset server of claim 15, wherein the objects include at least one of landscapes, buildings, vehicles, billboards, storefronts, or fixed game elements.

19. The digital asset server of claim 15, wherein the at least one digital message comprises at least one of an image, a graphical, textual or video message, or an animated graphic.

20. The digital asset server of claim 15, wherein, when executed by the at least one processor, the plurality of programmatic instructions associate the score with a monetary value.

21. The digital asset server of claim 15, wherein, when executed by the at least one processor, the plurality of programmatic instructions store the score in association with one of a plurality of tiers, where each of the plurality of tiers is associated with a monetary value.

22. The digital asset server of claim 21, wherein, when executed by the at least one processor, the plurality of programmatic instructions provide an input within the graphical user interface to receive a designation that associates the at least one digital message with at least one of the plurality of tiers.

23. The digital asset server of claim 15, wherein, when executed by the at least one processor, the plurality of programmatic instructions evaluate the scene to generate the score by analyzing the scene using at least one feature of the scene.

24. The digital asset server of claim 23, wherein the feature comprises at least one of locations or times of areas in the game space in which a traffic flow of virtual characters in the areas exceed a predefined threshold value.

25. The digital asset server of claim 23, wherein the feature comprises at least one of locations and times of areas in the game space, wherein the areas have a degree of visibility to players in the game space or spectators viewing the players in the game space that exceeds a predefined threshold value.

26. The digital asset server of claim 23, wherein the feature comprises at least one of a duration of exposure to players participating in the multi-player video game, a duration of exposure to spectators watching said players, a number or extent of obstructions positioned around said players, a viewing angle, a degree of lighting, a depth of the scene, or a size of an area available for the at least one digital message.

27. The digital asset server of claim 23, wherein the feature comprises at least one of a profile of a player participating in the game space or a profile of a spectator viewing the player participating in the game space.

28. The digital asset server of claim 15, wherein, when executed by the at least one processor, the plurality of programmatic instructions determine suitability of the at least one digital message to the scene based on at least one of a size of the at least one digital message, a subject matter of the at least one digital message, or visual attributes of the at least one digital message.

* * * * *